United States Patent
Hewavithana et al.

(10) Patent No.: US 8,879,676 B2
(45) Date of Patent: Nov. 4, 2014

(54) CHANNEL RESPONSE NOISE REDUCTION AT DIGITAL RECEIVERS

(75) Inventors: Thushara Hewavithana, Hertfordshire (GB); Bernard Arambepola, Middlesex (GB); Parveen K. Shukla, Nottinghamshire (GB); Sahan S. Gamage, Cambridgeshire (GB)

(73) Assignee: Intel Corporation, Santa Clara, CA (US)

( * ) Notice: Subject to any disclaimer, the term of this patent is extended or adjusted under 35 U.S.C. 154(b) by 264 days.

(21) Appl. No.: 13/286,776

(22) Filed: Nov. 1, 2011

(65) Prior Publication Data

US 2013/0107996 A1    May 2, 2013

(51) Int. Cl.
*H04L 25/08* (2006.01)
*H04L 25/02* (2006.01)

(52) U.S. Cl.
CPC .......... *H04L 25/0212* (2013.01); *H04L 25/022* (2013.01)
USPC .......................................... 375/346; 375/350

(58) Field of Classification Search
USPC ......... 375/232, 240, 254, 284–285, 278, 346, 375/348
See application file for complete search history.

(56) References Cited

U.S. PATENT DOCUMENTS

| | | | |
|---|---|---|---|
| 6,583,823 B1 * | 6/2003 | Shimada et al. ............... | 348/616 |
| 2006/0188034 A1 * | 8/2006 | Sampath ....................... | 375/260 |
| 2009/0323843 A1 * | 12/2009 | Yang et al. .................... | 375/260 |
| 2010/0292993 A1 * | 11/2010 | Vaillancourt et al. ......... | 704/500 |
| 2011/0026577 A1 * | 2/2011 | Primo et al. ................... | 375/232 |
| 2011/0026618 A1 * | 2/2011 | Kent et al. ..................... | 375/260 |
| 2011/0064162 A1 * | 3/2011 | McCallister et al. ......... | 375/296 |
| 2012/0209900 A1 * | 8/2012 | Sorokine et al. ............. | 708/309 |
| 2013/0010903 A1 * | 1/2013 | Kent et al. ..................... | 375/340 |
| 2013/0136085 A1 * | 5/2013 | Ogawa et al. ................. | 370/329 |
| 2013/0223374 A1 * | 8/2013 | Iwai et al. ..................... | 370/329 |

* cited by examiner

*Primary Examiner* — Emmanuel Bayard
(74) *Attorney, Agent, or Firm* — Pillsbury Winthrop Shaw Pittman LLP (57) ABSTRACT

According to various embodiments, apparatus and methods disclosed herein may be implemented in a digital communication (wired or wireless) receiver, and relate to minimizing noise in an estimated channel frequency response at the receiver for the purposes of channel equalization. The disclosed apparatus and methods may include determining a channel impulse response based on an estimated channel frequency response. The estimated channel frequency response, the channel impulse response, or both may include noise. An impulse response mask may be determined based on the channel impulse response, and further applied to the channel impulse response to obtain a noise-reduced channel impulse response, which may be Fourier transformed to obtain a noise-reduced channel frequency response.

21 Claims, 5 Drawing Sheets

CHANNEL RESPONSE NOISE REDUCTION AT DIGITAL RECEIVERS

FIELD

This disclosure relates generally to digital (wired or wireless) communication and, more particularly, to techniques to reduce noise in an estimate of a channel frequency response for use in equalization in digital communication receivers.

BACKGROUND

The advanced television systems committee (ATSC) standard used for terrestrial digital television (DTV) is based on single-carrier VSB modulation. ATSC mobile/handheld (ATSC M/H) standard is a mobile/handheld variant of the ATSC standard. The digital multimedia broadcast-terrestrial/handheld (DMB-T/H) standard is another DTV standard that uses single-carrier modulation technique. Conventionally, the signals received at DTV receivers (ATSC, DMB, or any other receiver) suffer from multi-path or echo interference, and include additive noise. Accordingly, to mitigate such interference, the DTV receivers may be configured to perform channel equalization. However, multi-path profiles of the signals handled by the DTV receivers (particularly, the mobile receivers) may be time-varying, and as such, the receivers may need to be designed and configured to handle dynamic channel equalization.

The equalization techniques at the receiver may utilize a channel impulse response, which may include additive noise from the channel, and other feedback noise. As such, it is important to reduce or remove noise from the channel frequency response for accurate and efficient equalization of the received signal.

DETAILED DESCRIPTION

In the description that follows, like components have been given the same reference numerals, regardless of whether they are shown in different aspects. To illustrate one or more aspect(s) of the present disclosure in a clear and concise manner, the drawings may not necessarily be to scale and certain features may be shown in somewhat schematic form. Features that are described and/or illustrated with respect to one aspect may be used in the same way or in a similar way in one or more other aspects and/or in combination with or instead of the features of the other aspects of the technology disclosed herein.

SUMMARY

In accordance with various embodiments of the present disclosure, the issue of noise in an estimated channel frequency response is addressed by applying a mask to a channel impulse response obtained from the channel frequency response, such that the noisy samples of the channel impulse response, and therefore, in the channel frequency response, are reduced or removed. The mask may be determined or computed based on the properties of the channel impulse response.

In broad overview, systems, devices and methods in accordance with various embodiments of the present disclosure may be implemented in connection with digital communication receivers, e.g., digital television (DTV) receivers, including, but not limited to, receivers based on advanced television systems committee (ATSC) standard, ATSC mobile/handheld (ATSC M/H) standard, or digital multimedia broadcast-terrestrial/handheld (DMB-T/H) standard. In some embodiments, the digital communication receivers are configured to equalize (in time- or frequency-domain), and demodulate signals that were modulated (e.g., at a transmitter) using at least one of a plurality of single-carrier modulation schemes, such as vestigial sideband (VSB) modulation schemes, and quadrature amplitude modulation (QAM) schemes. In accordance with various embodiments of the present disclosure, a method is disclosed that includes determining, using a processor, a channel impulse response based on an estimated channel frequency response. The estimated channel frequency response, the channel impulse response, or both may include noise. For example, the channel impulse response may be determined by performing an inverse Fourier transform on the estimated channel frequency response.

The method may further include determining an impulse response mask based on the channel impulse response, e.g., by estimating each sample of the mask based on a magnitude of a corresponding sample of the channel impulse response. In some embodiments, the operation of estimating each of the mask samples includes applying a linear operation (e.g., a linear averaging operation) on the magnitude of the sample of the channel impulse response and a corresponding sample of a previous channel impulse response calculated for a previous data block. The linear operation may be implemented using a first-order recursive low-pass filter.

In some embodiments, the operation of estimating each mask sample includes determining an average channel impulse response, and applying a threshold on each sample of the average channel impulse response, such that a sample value below the threshold is set to zero. The threshold may be selected as a predetermined level (e.g., about 30 dB) below the maximum sample value of the average channel impulse response. Further, the operation of estimating each mask sample may include setting the non-zero sample values of the average channel impulse response equal to one, such that at least a part of the average channel impulse response is represented by a rectangular waveform. One or more edges of the rectangular waveform may be tapered, e.g., by applying a raised-cosine function on the rectangular waveform edges.

In some embodiments, the method further includes applying (e.g., multiplying) the mask to the channel impulse response to obtain a noise-reduced channel frequency response. The mask-applying operation may produce a noise-reduced channel impulse response, and as such, the method may further include performing a Fourier transform on the noise-reduced channel impulse response to obtain the noise-reduced channel frequency response.

In accordance with various embodiments of the present disclosure, another method is disclosed, which includes determining, using a processor, a channel impulse response based on an estimated channel frequency response. The estimated channel frequency response, the channel impulse response, or both may include noise. The method may further include applying an impulse response mask to the channel impulse response to obtain a noise-reduced channel impulse response, such that all samples of the channel impulse response other than samples within a specific time window are set to zero. In some embodiments, the time window includes a time index corresponding to a maximum sample value of the channel impulse response.

In accordance with various embodiments of the present disclosure, an apparatus is disclosed that includes a first transform module, a mask generation module, and a mask application module. The first transform module may be configured to determine a channel impulse response based on an estimated channel frequency response, e.g., by performing an inverse Fourier transform. The estimated channel frequency response, the channel impulse response, or both may include noise.

In some embodiments, the mask generation module is configured to determine an impulse response mask based on the channel impulse response. For example, the mask generation module may be configured to estimate each sample of the mask based on a magnitude of a corresponding sample of the channel impulse response. In some embodiments, the mask generation module is configured to apply a linear operation (e.g., a linear averaging operation) on the magnitude of the sample of the channel impulse response and a corresponding sample of a previous channel impulse response calculated for a previous data block. The mask generation module may include a first-order recursive low-pass filter to perform the linear operation. The mask generation module may be further configured to determine an average channel impulse response, and apply a threshold on each sample of the average channel impulse response, such that the a sample value below the threshold is set to zero. The mask generation module may be further configured to set the non-zero sample values of the mask equal to one, such that at least a part of the channel impulse mask is represented by a rectangular waveform. One or more edges of the rectangular waveform may be tapered (e.g., using a raised-cosine function) by the mask generation module.

In some embodiments, the mask application module is configured to apply the mask to the channel impulse response to obtain a noise-reduced channel frequency response. For example, the mask application module may be further configured to produce a noise-reduced channel impulse response, and a second transform module of the apparatus may perform a Fourier transform on the noise-reduced channel impulse response to obtain the noise-reduced channel frequency response.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

DESCRIPTION

Figure 1:
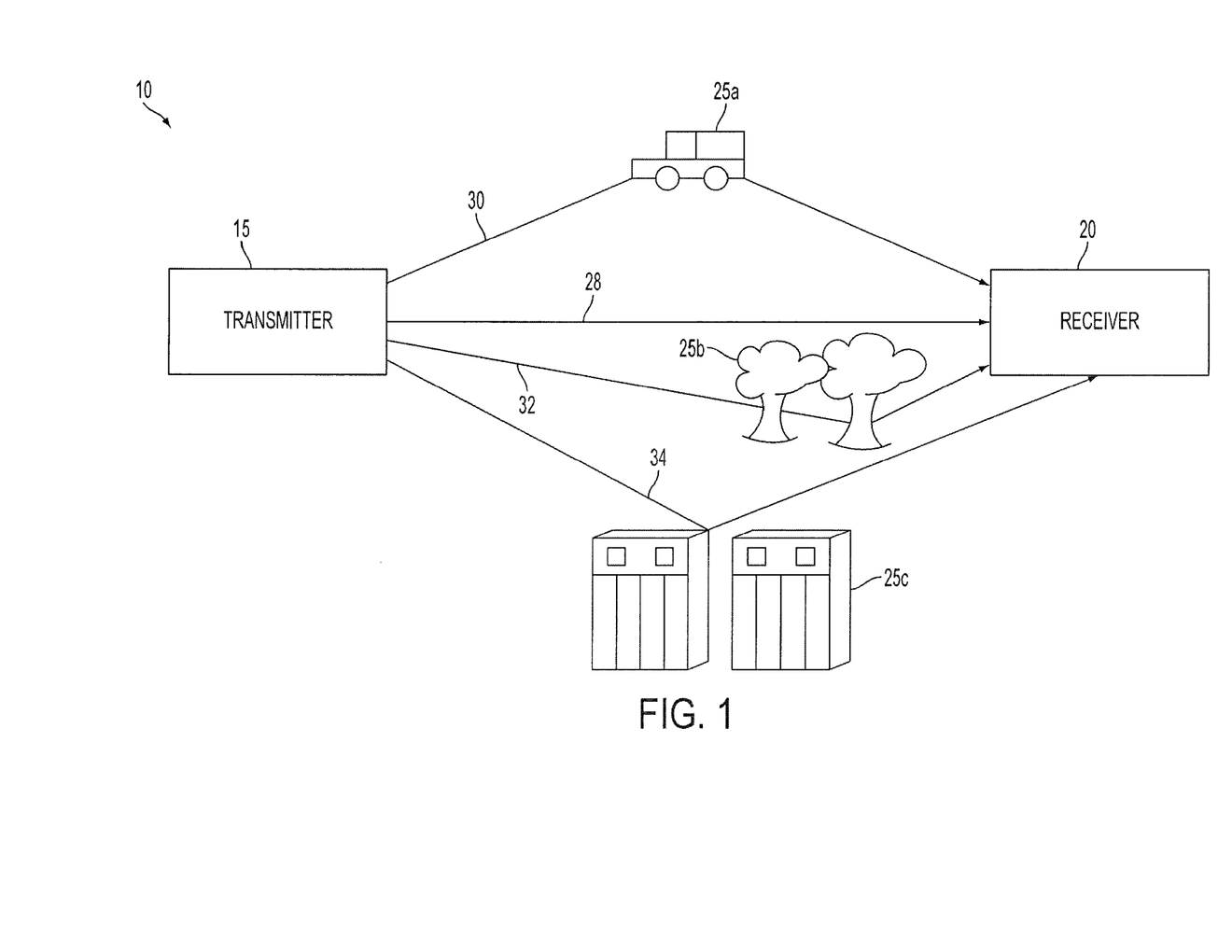
FIG. 1 depicts an example of wireless communication between a transmitter and a receiver.

FIG. 1 depicts a typical wireless transmission, e.g., in a DTV system 10 from a transmitter 15 to a receiver 20. DTV system 10 may be implemented based on one of a plurality of DTV standards including, but not limited to, ATSC standard, ATSC M/H standard, or DMB-T/H standard. Accordingly, transmitter 15 and/or receiver 20 may be configured to operate in system 10 in accordance with the standard used as the basis for DTV system 10. For example, transmitter 15 may be configured to modulate audio, video and/or other data signals using at least one of a plurality of single-carrier modulation schemes including, but not limited to, VSB modulation schemes and QAM modulation schemes. Similarly, receiver 20, which may be static or mobile, may be configured to demodulate signals received from transmitter 15 based on the demodulation scheme corresponding the modulation scheme used at transmitter 15. In some embodiments, receiver 20 includes, or may be implemented within a user-operated device. Examples of such a user-operated device may include, but not limited to, a cellular phone operational with system DTV system 10 as well as with a cellular phone network (not shown), a laptop, a smartphone, and other mobile and/or handheld devices capable of receiving, processing and/or rendering multimedia information. For simplicity, only one transmitter and receiver is illustrated, but it should be appreciated that the system and method of this disclosure are intended to apply to situations where there are multiple transmitters and/or receivers in DTV system 10.

As depicted in FIG. 1, because of reflection from objects 25 in the area and/or if the transmitter 15 and receiver 20 move relatively fast with respect to one another, the signal from transmitter 15 to receiver 20 may include multiple paths. In other words, the channel carrying the modulated signal from transmitter 15 to receiver 20 may include multiple paths, e.g., the most direct path 28 and additional paths 30, 32, 34. Each path may have associated with it a gain or attenuation ($h_0$, $h_1$, $h_2$, or $h_3$) and a phase shift ($m_0$, $m_1$, $m_2$, or $m_3$). The attenuation and/or phase shift of one or more of paths 28, 30, 32, 34 may vary in time, i.e., from one time instant to another, and as such, the channel including those paths may be considered as a time-varying channel that may be, e.g., modeled using random processes. Accordingly, multiple replicas, with different attenuations and different phase shifts, of the modulated signal are received at receiver 20. Additionally, there may be noise (e.g., additive white Gaussian noise, etc.) added to the signal during transmission. Accordingly, the signal received at receiver 20 may suffer from multipath propagation including fading (e.g., Rayleigh fading, etc.) and/or inter-symbol interference (ISI), and additive noise. In some embodiments, the ISI noise in the received signal results in erroneous decoding or demodulation of the received signal, and as such, an equalizer (e.g., as illustrated in FIG. 2 and described in detail below) may be used to mitigate or eliminate the ISI noise and accurately recover the transmitted signal.

Figure 2:
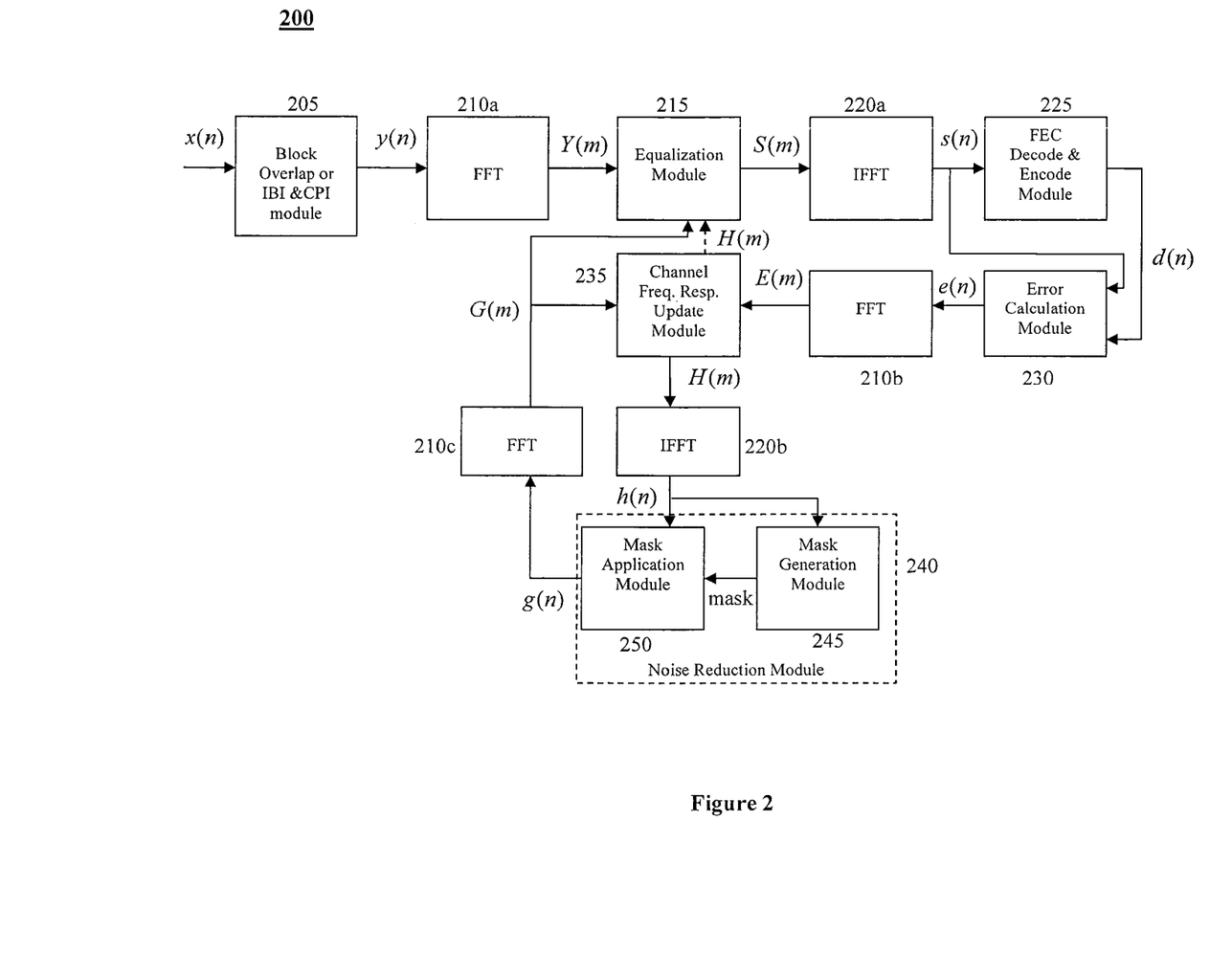
FIG. 2 is a block diagram of an exemplary receiver in accordance with various embodiments of the present disclosure.

FIG. 2 depicts an exemplary embodiment in form of system 200 configured to, among other functions, estimate channel frequency responses, reduce noise in the estimated channel frequency responses, and implement equalization techniques in accordance with various aspects of this disclosure. System 200 may be implemented within, or may be operatively associated with receiver 20. As depicted, system 200 may include a block overlap module or an inter-block interference cancellation and cyclic prefix insertion (IBI & CPI) module 205, fast Fourier transform (FFT) modules 210a, 210b, 210c, an equalization module 215, inverse fast Fourier transform (IFFT) modules 220a, 220b, a forward error correction (FEC) encode and decode module 225, an error calculation module 230, a channel frequency response update module 235, and a noise reduction module 240. Noise reduction module 240 may include a mask generation module 245, and a mask application module 250. For clarity, resources and/or components of system 200 not required or related to channel frequency response-estimation, equalization, or noise-reduction operations are not shown in FIG. 2, but those resources, components and/or modules (and functions performed by them) will be appreciated by a person of ordinary skill in the art as being part of receiver 20 or operatively associated with system 200. Such known receiver components may include a tuner, an analog-to-digital converter, a channel filter, a timing recovery module, a carrier recovery module, a forward error correction module, and/or other components.

In operation, in some embodiments, transmitted signal (e.g., from transmitter 15) is received at module 205 of system 200 as a received signal x(n) which may be distorted and noisy due to, e.g., multipath interference. The index n denotes time index for the signal. In some embodiments, a signal x(n) may be received at system 200 as a series of blocks of data (in time-domain), and such blocks of data may be negatively impacted by inter-block interference during transmission. If module 205 is configured as a block overlap module, module 205 may be configured to receive input data blocks and overlap the data blocks for seamless processing in the frequency domain in system 200. The length of overlap in the data blocks may be at least equal to the length of the channel impulse response in system 200. Alternatively, if module 205 is configured to a IBI & CPI, module 205 may be configured to correct inter-block interference within the received signal x(n) by using equalized data, i.e., s(n−1), from the previous data block. In some embodiments, channel impulse response, h(n), needed to estimate IBI is computed based on current channel frequency response estimate (e.g., by computing inverse Fourier transform of channel frequency response, H). Cyclic prefix (CP) restoration may use an estimate of current block, s(n), to determine cyclic prefix contribution that is added to the beginning of IBI-cancelled block x(n) based on the current channel impulse response, h(n). The restoration may make signal y(n) (i.e., output of module 205) appear to be a cyclic convolution between s(n) and h(n). Accordingly, to implement CP restoration, at least two iterations through the equalization process (as discussed below) may be required. For example, in the first iteration, an estimate of s(n) may not be obtained, and therefore no CP restoration may be possible. Accordingly, a second iteration may be performed such that CP restoration is executed using an estimate of s(n) from the first iteration.

Each block of data of the signal y(n) may then be provided as an input to FFT module 210a for converting the block's data from the time domain to the frequency domain using a Fourier transform. Frequency-domain signal Y(m), where m denotes the frequency index, thus generated includes Fourier coefficients that correspond to the data symbols of the data block of the signal y(n) (which are to be equalized and decoded). In some embodiments, the size of the received data blocks (of, e.g., the signal y(n)), and therefore, the number of samples in a block provided as an input to FFT modules 210a, 210b, 210c to perform Fourier transform (or to IFFT modules 220a, 220b to compute inverse Fourier transform) may be selected based on a specific implementation of system 200. For example, if implemented in hardware, a larger block size, e.g., equal to 8000 samples in one data block, may be selected. Such large block size may result in increased computational complexity, which may be handled by the suitable hardware implementation.

On the other hand, if system 200 is implemented in software, it may be desired to implement the Fourier transforms (and inverse Fourier transforms) with relatively smaller complexity, and higher speed and efficiency. As such, for software implementation, a block size, e.g., equal to 2000 samples in one data block, that is smaller than the block size for hardware implementation may be selected. Additionally, or alternatively, the block size may be selected based on the maximum echo delay of the multipath transmission channel between transmitter 15 and receiver 20. Further, the block size may be selected based on the mobility characteristics of receiver 20, and therefore, system 200, which may be indicative of the rate of change of the characteristics of the time-varying channel. For example, if receiver 20 is substantially stationary, or moving at a slow speed of, e.g., 5 miles per hour, a larger block size of, e.g., 8000 samples per data block, may be selected. And, if receiver 20 is moving at a higher speed, a smaller block size of, e.g., 2000 samples per data block, may be selected. Further, although FFT modules 210a, 210b, 210c (or IFFT modules 220a, 220b) are described as using fast Fourier transform techniques to compute a Fourier transform (or inverse Fourier transform), any other technique to compute discrete Fourier transform (DFT) may be used.

One block of the frequency-domain signal Y(m) is fed as an input to equalization module 215 which may also receive an estimated channel frequency response H(m) or a noise-reduced estimated channel frequency response G(m) (also in the frequency domain) from memory or storage 240c at its input. Equalization module 215 may process the signal Y(m) and the (noise-reduced) estimated channel frequency response to eliminate the inter-symbol interference (due to multipath nature of the channel), and recover the accurately transmitted signal. The recovered signal at the output of equalization module 215 is labeled as frequency-domain signal S(m). Equalization module 215 may be configured to process its inputs using one or more equalization algorithms. For example, equalization module 215 may be include implementations of a linear equalizer, a decision feedback equalizer, a blind equalizer, a Viterbi equalizer, and/or a turbo equalizer, features and other details of which will be well known to a person of skill in the art. In some embodiments, equalization module 215 is implemented as a linear equalizer, and performs the equalization based on minimum mean square error (MMSE) estimation technique to obtain an estimate of the transmitted signal using the following mathematical operation:

$$S(m) = \frac{Y(m)H^*(m)}{|H(m)|^2 + N(m)}, \quad (1)$$

where N(m) is an estimate of the power spectral density of the channel noise (in the frequency domain). In some embodiments, noise estimate N(m) is initialized based on a pseudo random number (PN) sequence present in ATSC frames or any other training sequences present in the received signal. However, in the absence of any training sequences, the noise spectrum may initially be assumed flat and all values of N(m) may be set to the power spectral density of white noise, i.e., $N(m)=\sigma_N^2$. In some embodiments, the channel frequency response estimate H(m) is initialized based on a PN sequence present in ATSC frames. However, in the absence of such training sequences, H(m) is initialized as unity, for all values of frequency index m.

The equalized signal S(m) is then converted into time-domain by inputting it to IFFT module 220a that computes an inverse Fourier transform of the signal S(m). The time-domain signal s(n) obtained as an output of IFFT module 220a is then fed as an input to FEC decode and encode module 225, which produces a decision signal d(n). The decision signal d(n) includes multiple time-domain samples each of which represents an accurate estimate of the corresponding sample of the transmitted signal. In some embodiments, FEC decode and encode module 225, for decode operation, is configured to de-map equalized data block s(n) with noisy constellation points into corresponding bits, which are then decoded based on the forward error correction (FEC) scheme used in the signal to correct for any bit errors. Further, for encode operation, FEC module 225 re-encode error-corrected decoded bits to create transmitted bit stream. Bits from the created bit stream are then mapped to constellation points to form a more accurate version of s(n), i.e., the decision signal d(n). A error signal e(n) (also termed as "decision error") is calculated using the equalized time-domain signal s(n) and the decision signal d(n) in error calculation module 230. The error signal e(n) is then converted into frequency-domain by inputting it to FFT module 210b that computes a Fourier transform of the signal e(n) to generate signal E(m).

The error signal E(m) is provided to channel frequency response update module 235, which may be configured to update the channel frequency response H(m) (from its initial value, or a previous estimated value). For example, module 235 may be configured to update the channel frequency response H(m) based on the following relation:

$$H_i(m) = f(H_{i-1}(m), E_i(m), Y_i(m), N_i(m)) \quad (2)$$

where i denotes data block number. Although the above-described technique to estimate or update the channel frequency response is based on the error signal, in some embodiments, the decision signal d(n) is directly processed and used to update the channel frequency response. One such exemplary non-limiting implementation is described in detail in U.S. patent application Ser. No. 13/185,091, the disclosure of which is incorporated herein by reference in its entirety. Other techniques to estimate and/or update a channel frequency response H(m) may be used.

An estimate of the channel frequency response H(m) obtained as in equation (2) (or using other techniques) may be inaccurate or "noisy" due to additive input noise as well as decision errors. In some implementation, the noise in the channel frequency response estimate may be reduced through time filtering, i.e., by averaging the channel frequency response obtained from a number of successive data blocks. However, in this technique, the channel is assumed to be stationary (i.e., not time-varying), which may not apply for mobile users scenarios that may present time-varying channels. Moreover, even in static and portable applications, the channel may not be assumed to be stationary since there may be time-varying reflections from moving objects. Accordingly, a technique that does not rely on time filtering is described in detail below (specifically, with reference to noise reduction module 240).

In general, noise reduction module 240 may be configured to generate a mask using an estimated impulse response h(n) (e.g., using mask generation module 245), which is computed from the estimated channel frequency response H(m). Since, as discussed above, the frequency response contains noise (that needs to be removed or reduced), the impulse response contains the noise as well. Further, noise reduction module 240 may be configured to apply the generated mask back to the impulse response (e.g., using mask application module 250), and compute a noise-reduced channel impulse response g(n), which may be further used to compute a noise-reduced channel frequency response G(m).

In some embodiments, IFFT module 220b is used to generate an impulse response h(n) from the estimated channel frequency response H(m) (e.g., from module 235). The impulse response h(n) is fed as an input to both mask generation module 245 and mask application module 250. In some embodiments, mask generation module 245 is configured to detect a maximum value in the channel impulse response h(n) (i.e., a time-domain signal), and the corresponding time index n for the maximum impulse response value. Mask generation module 245 may be further configured to create a time-domain rectangular signal (i.e., a "mask") that is equal to value one for a time window spanning a predetermined fixed amount of time around the time index n corresponding to the maximum impulse response value, and value zero otherwise. For example, the predetermined fixed amount of time around that "maximum" time index n may be equal to $\pm 3$ µs, and as such, the mask may be a rectangular signal or waveform with value equal to one for a time window of width equal to 6 µs, and zero for all other time indices. The window may not symmetric around the time index n, and values other than 3 µs may be selected. In some implementations, the window size is not predetermined, and as such, it is dynamically determined based on channel conditions and other detected and/or known factors related to digital communication. In some embodiments, mask generation module 245 is configured to taper or round the edges of the rectangular mask signal, e.g., using a raised-cosine function.

One assumption that may be made in computing a rectangular mask described above is that all reflections (i.e., different versions of the transmitted signal) of the signal are received at from within a distance not very far from receiver 20 (say, e.g., within about 1000 m, which equates to an echo delay of about 3 µs in the received signal). Accordingly, it may be assumed that the channel impulse response will include impulse response components in a temporal range corresponding to the echo delay (i.e., $\pm 3$ µs). Many of the representative echo profiles used for ATSC receiver testing (e.g., the well known Brazil profiles) correspond to this delay profile. Further, the generated mask may be provided to mask application module 250, which may be configured to apply the mask to the channel impulse response h(n). For example, mask application module 250 may multiply the signal h(n) with the time-domain rectangular mask signal such that only the portion of the signal h(n) that corresponds to the mask time window (e.g., of size equal to 6 µs, in the example above) having value equal is retained, and the rest of the signal h(n) is set equal to zero. This filters out a significant amount of noise power from the channel impulse response, and generate a noise-reduced impulse response signal g(n). The signal g(n) may be provided to FFT module 210c to compute its Fourier transform, and generate a noise-reduced frequency response G(m), which may be further provided to equalization module 215 and/or to frequency response update module 235 for further processing.

As discussed above, in the above-described noise-reduction technique, it may be assumed that all the echoes of the received signal are from within a relatively short distance (e.g., 1000 m) of receiver 20. While this may be true for most scenarios supporting ATSC receivers, it may not hold true for other receivers, e.g., where the users are relatively highly mobile and/or because of other well-known factors. Accordingly, another technique to reduce noise from the channel impulse response that utilize approximate location of the multi-path or echoes in the channel impulse response h(n) is discussed below.

In general, this technique includes computing an average of the magnitude of impulse responses estimated for successive data blocks. When the channel is time-varying (as in the case of a mobile DTV receiver), the phase of the impulse response components may change rapidly because the phase is a function of the distance traveled in relation to the wavelength (i.e., the phase exhibits the Doppler effect). However, the "locations" (i.e., the time indices) of the impulse response components in the impulse response signal h(n) may not change as rapidly as the phase. Hence these locations can be estimated in the noisy environment by averaging magnitude (or the square of magnitude) of impulse response h(n) (excluding phase) for multiple successive received data blocks.

Figure 3A:
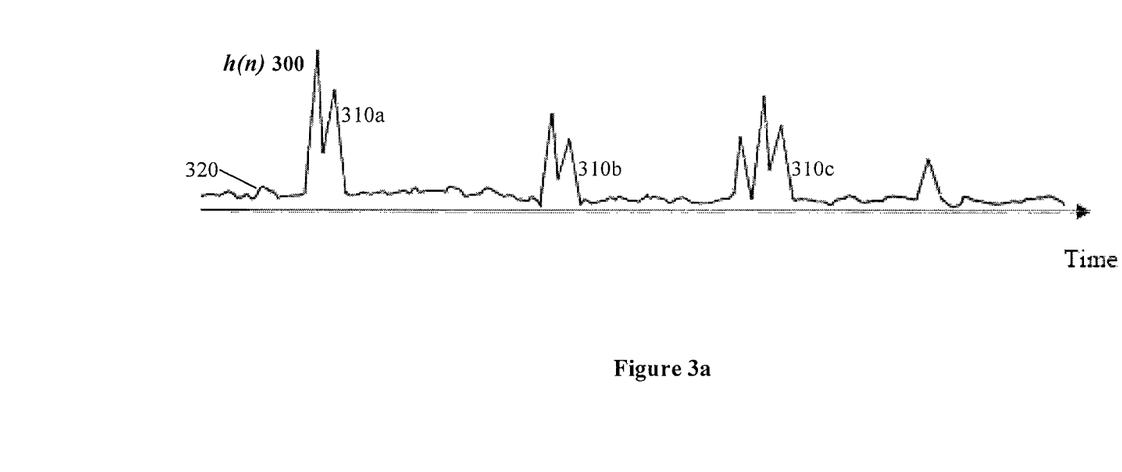
FIG. 3 depicts waveforms related to a channel impulse response and an impulse response mask in accordance with various embodiments of the present disclosure.

FIG. 3a depicts an estimated noisy channel impulse response h(n) 300 obtained after applying IFFT (at IFFT module 220b) to an estimated noisy frequency response H(m). Signal h(n) 300 may be provided to both mask generation module 245 and mask application module 250. In some embodiments, mask generation module 245 is configured to compute an average of the inputted channel impulse response signals, e.g., signal 300, e.g., using a first order recursive low-pass filter. The averaging operation of the filter may be mathematically represented by the following equation:

$$h\_ave_i(n)=(1-\alpha)h\_ave_{i-1}(n)+\alpha|h_i(n)| \quad (3)$$

where, h_ave denotes the averaged channel impulse response, h is the estimated channel impulse response (and |h(n)| denotes the magnitude of the $n^{th}$ sample of the impulse response), n is the time or sample index, i denotes the block index (wherein i−1 denotes a previous block corresponding to a current block i), α is the averaging constant less than one. Note that the low-pass filtering based on equation is done from data block to data block, and not within a data block (i.e., it is inter-block, and not intra-block). Instead of the recursive averaging technique of equation (3), other known averaging techniques may be employed, e.g., summing corresponding impulse response magnitudes in L successive blocks and then dividing by L. The averaging process may reduce the noise level in the channel impulse response h(n) relative to the "impulses" (indicated by 310a-310c) in the impulse response.

Following the averaging operation, mask generation module 245 may be configured to apply a threshold to the current averaged channel impulse response h_ave$_i$(n), e.g., with respect to the largest "impulse," (e.g., 310a) to remove noise floor 320 in the averaged impulse response h_ave$_i$(n). For example, the threshold may be pre-selected and set equal to about 30 dB below the maximum value of h_ave$_i$(n), such that all the values of h_ave$_i$(n) that are below the threshold are forced to zero. The resulting impulse response may be denoted as h_ave_th$_i$(n), which may be used to form a time-domain impulse response mask for the current block i (e.g., denoted as mask$_i$(n)).

Figure 3B:
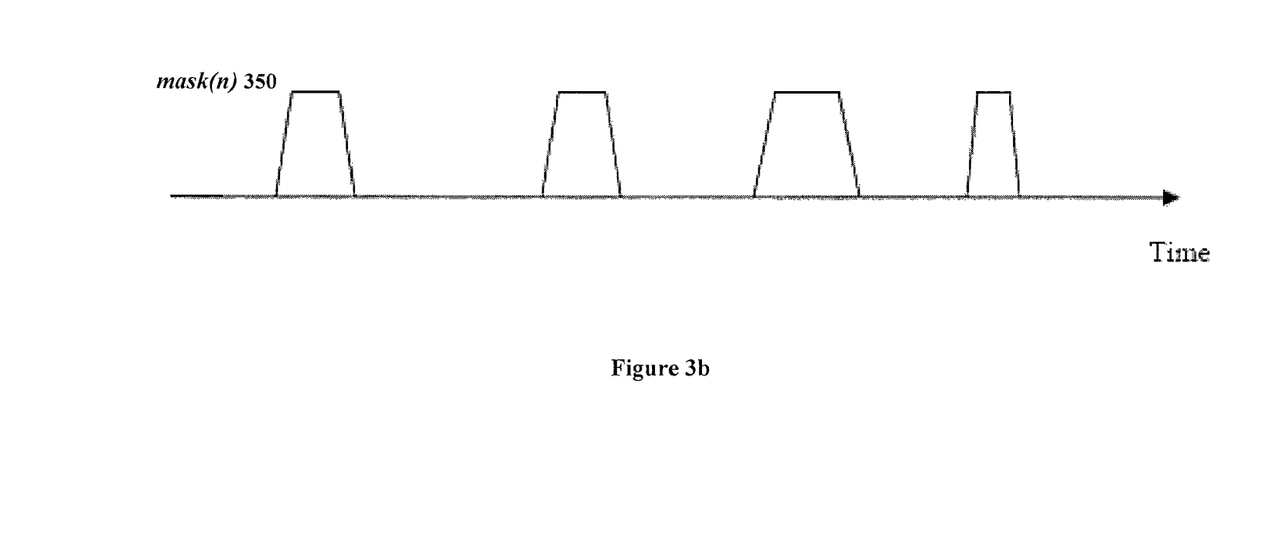

Accordingly, mask generation module 245 may be configured to set all the non-zero values of the signal h_ave_th$_i$(n) to unity (i.e., value equal to one), which will generate mask$_i$(n) as a rectangular waveform. In other words, mask$_i$(n) will have samples with value equal to one for time indices n corresponding to non-zero values in the signal h_ave_th$_i$(n), and value equal to zero for all other time indices. In some embodiments, mask generation module 245 is further configured to taper or round the edges of the rectangular mask signal mask$_i$(n), e.g., using a raised-cosine function. If two adjacent non-zero regions of the signal mask$_i$(n) overlap during this edge-tapering process, then those two regions may be merged to form one non-zero region and its edges are tapered as well. FIG. 3b illustrates an exemplary impulse response mask mask$_i$(n) 350 obtained by the technique described above.

Figure 3C:
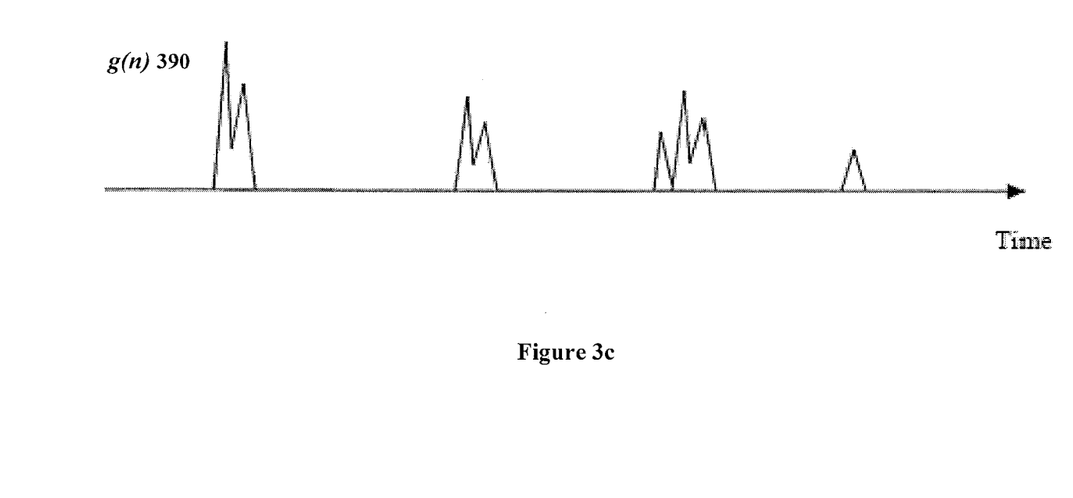

Further, mask 350 may be provided to mask application module 250, which may be configured to apply mask 350 is applied to the channel impulse response h(n). For example, mask application module 250 may multiply the signal h(n) with the mask 350 mask$_i$(n), resulting in a noise-reduced impulse response signal g(n) 390 depicted in FIG. 3c. As shown therein, noise (represented by noise floor 320) in estimated channel impulse response 300 is eliminated after applying mask 350 thereto. The mask application operation may be represented by the following equation:

$$g_i(n)=mask_i(n)*h_i(n) \quad (4)$$

Signal g(n) 390 may be provided to FFT module 210c to compute its Fourier transform, and generate a noise-reduced frequency response G(m); which may be further provided to equalization module 215 and/or to frequency response update module 235 for further processing.

Figure 4:
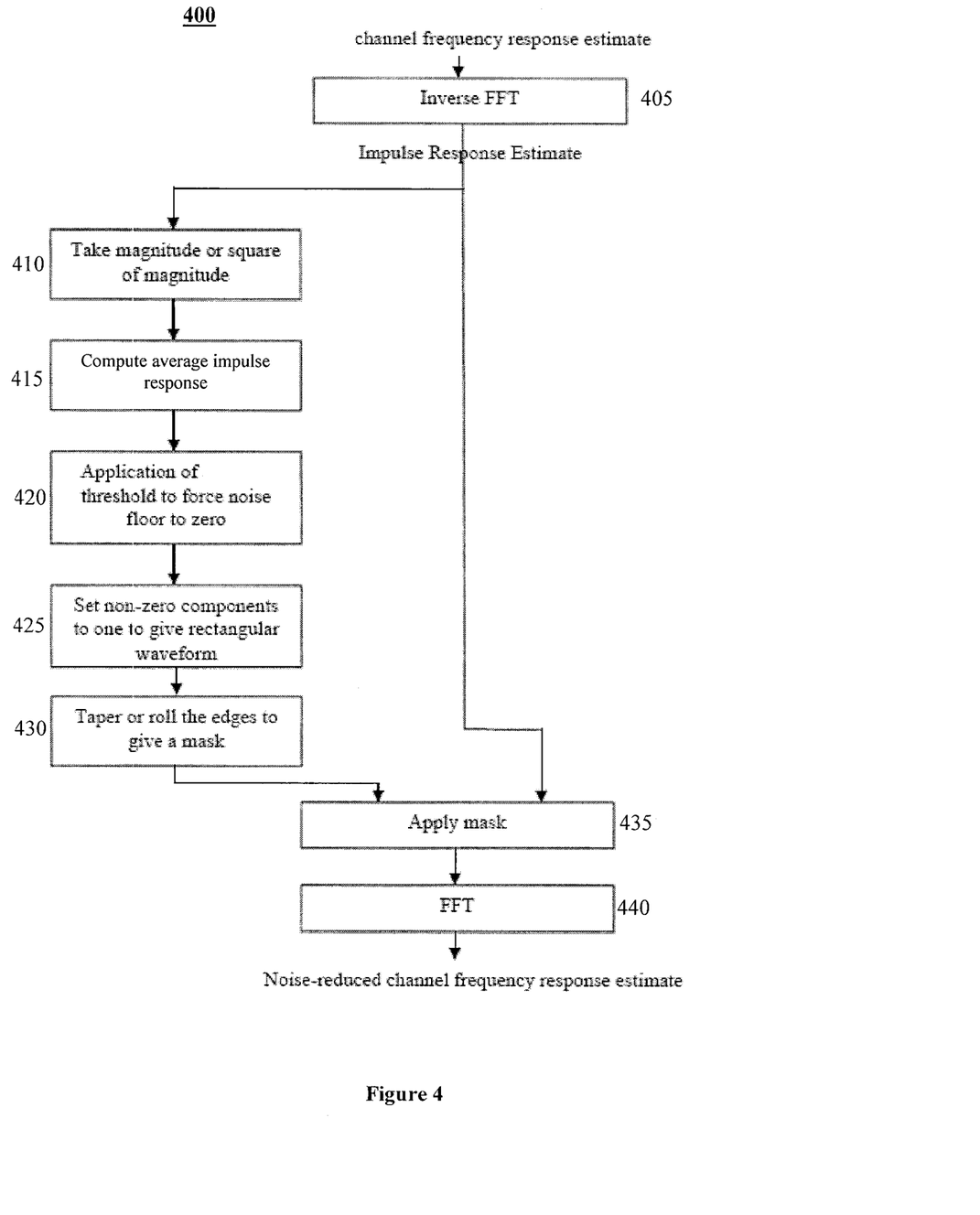
FIG. 4 depicts a flowchart of a noise-reduction process in accordance with various embodiments of the present disclosure.

FIG. 4 depicts a flow diagram of process 400 for reducing noise in an estimated channel frequency response H(m) at a receiver based on a channel impulse response, in accordance with various exemplary embodiments of the present disclosure. It will be appreciated that process 400 may be implemented as machine readable instructions for executing various operations carried out by receiver 20. The machine readable instructions may be implemented in software stored on tangible computer readable media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or implemented in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, or the like).

Moreover, although process 400 is described with reference to the flowcharts of FIG. 4, persons of ordinary skill in the art will readily appreciate that many other methods of implementing the techniques to reduce noise in a channel frequency response at a receiver may alternatively be used. For example, the order of execution of the blocks in the depicted flowchart may be changed, and/or some of the blocks described may be changed, eliminated, or combined.

Returning to FIG. 4, process 400 begins at operation 405, in which IFFT module 220b performs an inverse Fourier transform on an estimated channel frequency estimate H(m) for a current data block (e.g., provided by module 235) to generate an estimated channel impulse response h(n). The impulse response h(n) is provided to both mask generation module 245 and mask application module 250 for mask generation and application operations, respectively. For example, with regard to mask generation, in operation 410, mask generation module 245 computes magnitude (or square of magnitude) of each sample of the impulse response h(n). In operation 415, computes a average channel impulse response h_ave_th(n) for the current data block, e.g., using recursive time filtering based on equation (3), which utilizes the magnitude (or squared magnitude) of the impulse response of the current data block, and a previous average impulse response for a previous data block.

In operation 420, mask generation module 245 applies a (predetermined or dynamic) threshold to the averaged or filtered channel impulse response h_ave_th(n) to set the noise floor to zero, and in operation 425, sets the non-zero samples of h_ave_th(n) to one to generate an impulse response mask (mask(n)) represented as a rectangular waveform. In other words, mask(n) will have samples with value equal to one for time indices n corresponding to non-zero values in the signal h_ave_th(n), and value equal to zero for all other time indices. Further, in operation 430, mask generation module 245 tapers or rounds the edges of the rectangular mask signal mask(n), e.g., using a raised-cosine function. The tapered mask(n) signal (e.g., mask 350) is then provided to mask application module 250, which, in operation 435, applies the mask mask (n) to the estimated channel impulse response h(n) (from operation 405). Mask application module 250 may multiply the signal h(n) with mask 350 (e.g., as indicated in equation (4)), resulting in a noise-reduced impulse response signal g(n) 390 depicted in FIG. 3c. Mask application module 250 provides signal g(n) 390 to FFT module 210c to compute a Fourier transform on g(n) (i.e., operation 440), and generate a noise-reduced frequency response G(m), which may be further provided to equalization module 215 and/or to frequency response update module 235 for further processing.

In one or more embodiments, one or more modules of the system 200, or other components that a module of system 200 may be connected with (not shown in figures) may include one or more processors and/or individual memory modules, to perform the functions and processes described herein. Also, although the modules in FIG. 2 are shown as individual components or elements, in one or more embodiments, those modules may be combined into one or more devices, one or more software programs, or one or more circuits on one or more chips. In some embodiments, some modules or components of system 200 may be part of a system which is located geographically remotely from the rest of the modules or components of system 200. In such a case, the remotely located groups of modules may be operatively connected with each other through a wired or wireless network (not shown) using necessary interfaces and components. Such network may include one or more of a private TCP/IP network, the Internet, or a private or public radio frequency (RF) network.

In some embodiments, one or more modules of system 200 are realized in one or more programmable devices such as a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Alternatively, or additionally, one or more modules of system 200 may be implemented in software stored on an article of manufacture (e.g., floppy disks, CDs, hard disks, flash drives, etc.) to enable a general-purpose processor to perform the specific functions described herein, or combination of hardware and software.

As would be understood by a person with skill in the art, the functional block diagram of FIG. 2 is presented merely an aid in understanding the various functions of system 200, and actual implementation of the desired functionality may be implemented by fewer or more functional modules. It must be understood that so long as the system performs all necessary functions, it is immaterial how they are distributed within the system and the programming or hardware architecture thereof.

In some embodiments, one or more storages or memories 240a, 240b, 240c are of one or more of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device. Memories 240 may be capable of storing one or more quantities or data including, but not limited to, multiple previously-computed channel frequency responses, prediction coefficients to be used in a linear prediction operation, a newly-computed channel frequency responses, and any other data. Data stored in one or more of memories 240 may be used to perform the functions or operations described herein below.

Various embodiments herein are described as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A method comprising:
    determining, using a processor, a channel impulse response based on an estimated channel frequency response, wherein the estimated channel frequency response, the channel impulse response, or both include noise;
    determining, using the processor, an impulse response mask including estimating each sample of the mask, wherein said estimating each sample of the mask includes determining an average of the channel impulse response, and applying a threshold on each sample of the average channel impulse response, such that sample values of the average channel impulse response below the threshold are set to zero; and
    applying, using the processor, the mask to the channel impulse response to obtain a noise-reduced channel frequency response.

2. The method of claim 1, wherein said determining the channel impulse response includes performing an inverse Fourier transform on the estimated channel frequency response to obtain the channel impulse response.

3. The method of claim 1, wherein said applying the mask produces a noise-reduced channel impulse response, and the method further comprises performing a Fourier transform on the noise-reduced channel impulse response to obtain the noise-reduced channel frequency response.

4. The method of claim 1, wherein said estimating further includes applying a linear averaging operation on the magnitude of the sample of the channel impulse response and a corresponding sample of a previous channel impulse response calculated for a previous data block.

5. The method of claim 4, wherein said linear averaging operation is implemented using a first-order recursive low-pass filter.

6. The method of claim 1, wherein the threshold is a predetermined level below a maximum sample value of the average channel impulse response.

7. The method of claim 1, wherein estimating each sample of the mask further includes setting the non-zero sample values of the average channel impulse response equal to one, such that at least a part of the average channel impulse response is represented by a rectangular waveform.

8. The method of claim 7, wherein estimating each sample of the mask further includes tapering one or more edges of the rectangular waveform.

9. The method of claim 8, wherein said tapering includes applying a raised-cosine function on the one or more edges of the rectangular waveform.

10. The method of claim 1, wherein said applying the mask to the channel impulse response includes multiplying the impulse response mask with the channel impulse response.

11. A method comprising:
   determining, using a processor, a channel impulse response based on an estimated channel frequency response, wherein the estimated channel frequency response, the channel impulse response, or both include noise; and
   applying, using the processor, an impulse response mask to the channel impulse response to obtain a noise-reduced channel impulse response, such that all samples of the channel impulse response other than samples within a specific time window are set to zero,
   wherein the time window includes a time index corresponding to a maximum sample value of the channel impulse response and wherein the impulse response mask is symmetric around the time index.

12. The method of claim 11, wherein the time window spans about 6 μs.

13. The method of claim 11, further comprising tapering an edge of the impulse response mask using a raised-cosine functions.

14. An apparatus comprising:
   a first transform module configured to determine a channel impulse response based on an estimated channel frequency response, wherein the estimated channel frequency response, the channel impulse response, or both include noise;
   a mask generation module configured to determine an impulse response mask based on an average of the channel impulse response; and
   a mask application module configured to apply the mask to the channel impulse response to obtain a noise-reduced channel impulse response such that all samples of the channel impulse response other than samples within a specific time window are set to zero,
   wherein the impulse response mask is symmetric around a time index of the time window.

15. The apparatus of claim 14, wherein the first transform module is configured to perform an inverse Fourier transform on the estimated channel frequency response to obtain the channel impulse response, and
   the apparatus further includes a second transform module configured to perform a Fourier transform on the noise-reduced channel impulse response to obtain a noise-reduced channel frequency response.

16. The apparatus of claim 14, wherein, to determine the impulse response mask, the mask generation module is configured to estimate each sample of the mask based on a magnitude of a corresponding sample of the channel impulse response.

17. The apparatus of claim 16, wherein, to estimate each mask sample, the mask generation module is further configured to apply a linear averaging operation on the magnitude of the sample of the channel impulse response and a corresponding sample of a previous channel impulse response calculated for a previous data block.

18. The apparatus of claim 17, wherein the mask generation module includes a first-order recursive low-pass filter to perform the linear averaging operation.

19. The apparatus of claim 16, wherein, to estimate each mask sample, the mask generation module is further configured to determine an average channel impulse response, and apply a threshold on each sample of the average channel impulse response, such that the sample value below the threshold is set to zero.

20. The apparatus of claim 19, wherein, to estimate each mask sample, the mask generation module is further configured to set the non-zero sample values of the average channel impulse response equal to one, such that at least a part of the average channel impulse response is represented by a rectangular waveform.

21. The apparatus of claim 20, wherein, to estimate each mask sample, the mask generation module is further configured to taper one or more edges of the rectangular waveform.

* * * * *